United States Patent [19]

Ehrenkrona

[11] Patent Number: 5,985,812
[45] Date of Patent: Nov. 16, 1999

[54] METHOD OF REMOVING PAINT FROM SURFACES USING FATTY ACID ALKYL ESTERS

[75] Inventor: Carl Erik Ehrenkrona, Mjölby, Sweden

[73] Assignee: Svenska Rapsoljebolaget AB, Mjolby, Sweden

[21] Appl. No.: 08/913,083

[22] PCT Filed: Mar. 7, 1996

[86] PCT No.: PCT/SE96/00303

§ 371 Date: Oct. 28, 1997

§ 102(e) Date: Oct. 28, 1997

[87] PCT Pub. No.: WO96/27642

PCT Pub. Date: Sep. 12, 1996

[30]  Foreign Application Priority Data

Mar. 8, 1995  [SE]  Sweden .................................. 9500836

[51] Int. Cl.⁶ ...................................................... C09D 9/00
[52] U.S. Cl. ........................ 510/201; 554/223; 554/224; 252/162; 252/170; 252/364; 106/311; 134/38
[58] Field of Search ...................................... 252/162, 170, 252/364; 554/224, 223; 106/311; 134/38; 510/207

[56]  References Cited

U.S. PATENT DOCUMENTS 4,780,235  10/1988  Jackson .
5,340,495   8/1994  Mulcahy et al. .

FOREIGN PATENT DOCUMENTS 0608728   8/1994  European Pat. Off. .
90/03419  4/1990  WIPO .

*Primary Examiner*—Gary Geist
*Assistant Examiner*—Deborah D Carr
*Attorney, Agent, or Firm*—McDermott, Will & Emery

[57]  ABSTRACT

Lower alkyl esters of fatty acids can be used for the cleaning of paint brushes and/or for the removal of paint from painted surfaces.

11 Claims, No Drawings

METHOD OF REMOVING PAINT FROM SURFACES USING FATTY ACID ALKYL ESTERS

BACKGROUND OF THE INVENTION

The present invention relates to the new use of at least one lower alkyl ester of a fatty acid for the cleaning of paint brushes from wet or dry paint and/or for the removal of paint from painted surfaces.

In cleaning of brushes which have been used for painting with paints on non-aqueous basis white spirit is primarily used today which exhibits a number of known disadvantages from environmental and health point of view. Accordingly it is a long existing desire to be able to replace white spirit in cleaning of paint brushes with a cleaning liquid which is considerably more lenient from environmental and health point of view.

For the removal of paint from painted surfaces there are also used compositions which are less desirable from environmental as well as health point of view and the handling of which requires great care. Also in this case there is a long existing desire to be able to replace these compositions with an agent which is considerably more lenient from environmental and health point of view.

SUMMARY OF THE INVENTION

According to the present invention it was now surprisingly found that lower alkyl esters of fatty esters, which when compared with white spirits are considerably less toxic and more lenient to skin and environment than white spirit and paint removers found in the market, are fully comparable to white spirit as regards dissolving wet paint from a paint brush and more effective than white spirit as regards dissolving dried paint from a paint brush and in addition are effective as paint removers.

In accordance with the above, the present invention relates to the use of at least one lower alkyl ester of a fatty acid for the cleaning of paint brushes from wet or dry paint and/or for the removal of paint from painted surfaces.

DETAILED DESCRIPTION OF THE PREFERRED EMBODIMENTS

According to the invention a single ester may be used but preferably a mixture of esters of a number of different fatty acids will be used, said esters suitably having the same alkyl group in the moiety derived from an alkanol.

The term "lower alkyl ester" as used here and in the claims refers in this connection to an ester the alcohol moiety of which comprises a carbon chain which when compared to the acid moiety is shorter in length. The ester or esters suitably contain(s) a ($C_1$–$C_5$)alkyl group, such as methyl, ethyl or isopropyl, preferably methyl, in the alkanol moiety.

The fatty acid or acids of the ester(s) may be at least one aliphatic ($C_8$–$C_{22}$)monocarboxylic acid(s), preferably ($C_{12}$–$C_{22}$) monocarboxylic acid(s).

According to a preferred embodiment of the invention a mixture of methyl esters of aliphatic ($C_8$–$C_{22}$) monocarboxylic acids is used, preferably aliphatic ($C_{12}$–$C_{22}$)monocarboxylic acids such as those occurring in vegetable oils. These acids may be saturated as well as unsaturated but preferably the mixture contains esters of unsaturated esters.

In particular the lower alkyl esters to be used in accordance with the present invention comprise rape-oil methyl ester.

Rape-oil methyl ester is commercially available in different grades and composition depending on such factors as the growth conditions and the processing of the rape to oil, etc. As an example of the composition the following ranges of the contents of esters contained therein may be given:

| Ester | Content, % by weight |
| --- | --- |
| $C_{11}H_{23}COOCH_3$ | 0–1 |
| $C_{13}H_{27}COOCH_3$ | 0–1 |
| $C_{15}H_{31}COOCH_3$ | 2–8 |
| $C_{17}H_{35}COOCH_3$ | 0–6 |
| $C_{17}H_{33}COOCH_3$ | 50–60 |
| $C_{17}H_{31}COOCH_3$ | 18–27 |
| $C_{17}H_{29}COOCH_3$ | 6–12 |
| $C_{19}H_{39}COOCH_3$ | 0–2 |

The procedures in case of cleaning paint brushes as well as removing paint from painted surfaces using lower alkyl esters of fatty acids in accordance with the present invention are analogous to the procedures for the conventional use of white spirit and paint removers, respectively.

Accordingly the present invention also relates to a method of cleaning paint brushes from wet or dry paint or removing paint from painted surfaces, which method comprises contacting the brush or painted surface with at least one lower alkyl ester of a fatty acid for a sufficient time to cause the paint to dissolve or to come loose from the surface, respectively, and separating the dissolved or loosened paint and said at least one lower alkyl ester from the brush or surface.

When cleaning paint brushes from wet or dry paint soaking of the brush in e.g. rape-oil methyl ester for about 15 minutes will generally be sufficient to dissolve wet paint and paint left to dry in the brush for 15 hours. After the soaking the brush is suitably soaked in an aqueous solution of soap to remove residual ester with dissolved paint.

According to the present invention said lower alkyl esters may be used for the cleaning from or removal of many different kinds of paint such as, for instance, paints containing linseed-oil, an acrylic resin or an alkyd resin as the binder. The invention may appear not to be applicable to all existing paints depending on the composition thereof and some paints are easier to remove than others for the same reason.

According to an embodiment of the present invention in connection with the removal of paint, the alkyl esters are added with at least one thickening agent such as chalk or lime in order to increase the viscosity.

In case of paint removal the fatty acid alkyl esters are applied to the painted surface in an amount sufficient to provide the desired effect, it sometimes, e.g. in case of acrylic latex paint, being necessary to repeat the treatment.

After the alkyl esters have been allowed to exert their effect upon the paint for a suitable period (about 1–2 hours or shorter—even a period as short as 15 minutes will in many cases be sufficient) the paint is scraped off and/or washed away using suitable means such as an aqueous solution of tartaric acid, sodium hydrogen carbonate or soap.

The invention will now be described by means of a number of examples. It should be understood that these examples are for illustrative purposes only, and are not to be construed as limiting this invention in any manner.

EXAMPLE 1

Cleaning of Paint Brushes

Brushes were used for painting with different paints. Two brushes were used for each paint. Subsequent to the painting one of the brushes for each paint was placed into a vessel containing white spirit and the other brush was placed into a vessel containing rape-oil methyl ester. Soaking was performed for 1 hour whereafter the brushes were inspected. Acceptable effect was characterized by the brush being soft and lacking visible paint. Rape-oil methyl ester was found to give an acceptable effect in case of the following paints which were used in this experiment whereas white spirit failed to give such an effect.

A. Whitewash containing cellulose glue and oil alkyd emulsion from Nordsjö AB, Malmö, Sweden.
B. SANDOKRYL FIN VIT (trade name), paint using acrylate copolymer as binder and water as the solvent, from Nordsjö AB, Malmö, Sweden.
C. HÄFTGRUND VIT (trade name), paint using alkyd resin as the binder and white spirit as the solvent, from Nordsjö AB, Malmö, Sweden.
D. READY 90 (trade name), paint using alkyd resin as the binder and white spirit as the solvent, from Nordsjö AB, Malmö, Sweden.
E. TINOVA TÄCKFÄRG VIT (trade name), paint using acrylate copolymer as the binder and water as the solvent, from Nordsjö AB, Malmö, Sweden.
F. Paint containing linseed oil as the binder and white spirit as the solvent, from Nordsjö AB, Malmö, Sweden.
G. PANSAROL SILVER (trade name), paint using terpene phenolic resin as the binder and white spirit and xylen as the solvent, from Nordsjö AB, Malmö, Sweden.
H. BINDOPLAST 4 WO VIT (trade name), paint using vinyl chloride copolymer as the binder and water as the solvent, from Nordsjö AB, Malmö, Sweden.
I. PÅ MUR VIT (trade name), paint using acrylate copolymer as the binder and white spirit as the solvent, from Nordsjö AB, Malmö, Sweden.

In addition when testing against a number of other paints in which water is used as the solvent rape-oil methyl ester was found to cause softening of the brush and the paint formed flocks which could be removed mechanically from the brush.

EXAMPLE 2

Removal of Paint from Painted Surface

A number of different paints were applied onto the surface of a fibre board and allowed to dry for 2 months. A paper towel was laid on the painted surface and rape-oil methyl ester was applied to the paper towel by means of a brush.

After 15 minutes the towel was removed. In this experiment the following paints were found to be removable by scraping after this treatment:

Paints A, B, C, E, F, G, H and I identified in Example 1 and the following:

J) Bindoplast 20 WO-Vit (trade name), paint using vinyl chloride copolymer and acrylate copolymer as the binder and water as the solvent, from Nordsjö AB, Malmö, Sweden.
K) Innegrund Vit (trade name), paint using acrylate copolymer as the binder and water as the solvent, from Nordsjö AB, Malmö, Sweden.
L) Tålvägg 40 WO Vit (trade name), paint using acrylate copolymer as the binder and water as the solvent, from Nordsjö AB, Malmö, Sweden.
M) Tempera comprising a casein-oil alkyl emulsion in water, from Nordsjö AB, Malmö, Sweden.

I claim:

1. Method of cleaning paint brushes from wet or dry paint or removing paint from painted surfaces which method comprises contacting the brush or painted surface with at least one lower alkyl ester of a fatty acid for a sufficient time to cause the paint to dissolve or to come loose from the surface, respectively, and separating the dissolved or loosened paint and said at least one lower alkyl ester from the brush or surface.

2. Method according to claim 1, wherein said at least one lower alkyl ester of a fatty acid contains a $(C_1-C_5)$-alkyl group.

3. Method according to claim 1, wherein the paint to be removed from the brush or surface is a paint containing linseed-oil, an acrylic resin or an alkyd resin as the binder.

4. Method according to claim 1, wherein said at least one lower alkyl ester of a fatty acid is a mixture of methyl esters of aliphatic $(C_8-C_{22})$monocarboxylic acids.

5. Method according to claim 1, wherein rape-oil methyl ester is used as said at least one lower alkyl ester of a fatty acid.

6. Method according to claim 1, wherein said at least one lower alkyl ester contains at least one aliphatic $(C_8-C_{22})$ monocarboxylic acid.

7. Method according to claim 2, wherein said at least one lower alkyl esther of a fatty acid contains a methyl group in the alkanol moiety.

8. Method according to claim 4, wherein said at least one lower alkyl esther of a fatty acid is a mixture of aliphatic $(C_{12}-C_{22})$ monocarboxylic acid.

9. Method according to claim 1, wherein said at least one lower alkyl esther contains at least one aliphatic $(C_{12}-C_{22})$ monocarboxylic acid.

10. Method according to claim 1, wherein the paint to be removed is a paint containing linseed oil, and acrylic resin or an alkid resin as the binder.

11. Method of claim 1, wherein, when removing paint from a painted surface, said at least one lower alkyl esther of a fatty acid is added with at least one thickening agent.

* * * * *